Aug. 25, 1953 P. K. WEIMER 2,650,264

COLOR TELEVISION REPRODUCING SYSTEM

Filed Dec. 22, 1949

3 Sheets-Sheet 1

Inventor

Paul K. Weimer

By

[signature]

Attorney

Aug. 25, 1953 P. K. WEIMER 2,650,264

COLOR TELEVISION REPRODUCING SYSTEM

Filed Dec. 22, 1949

3 Sheets-Sheet 2

Inventor

Paul K. Weimer

By

[signature]

Attorney

Inventor
Paul K. Weimer
By
[signature]
Attorney

Patented Aug. 25, 1953

2,650,264

UNITED STATES PATENT OFFICE 2,650,264

COLOR TELEVISION REPRODUCING SYSTEM

Paul K. Weimer, Princeton, N. J., assignor to Radio Corporation of America, a corporation of Delaware Application December 22, 1949, Serial No. 134,453

32 Claims. (Cl. 178—5.4)

This invention relates to signal display systems employing a single cathode ray tube for the display of signals in a plurality of different colors and particularly, but not necessarily exclusively, to color television systems of this character wherein the reproducing tube is adapted to reproduce an image substantially in its natural colors.

Most of the television systems which have previously been devised for the reproduction of images substantially in their natural colors have been somewhat complex in nature. The complexity of a typical one of those prior art systems, which has had at least some practical success, is the result of the employment therein of a single reproducing tube in combination with a mechanically movable color filter device.

Among the disadvantages of the type of color television system embodying a prior art filter device are the additional space necessary to house the color filters, thereby increasing the size of the instrument, and the mechanical movement of the filter device, thereby producing objectionable noise and vibration.

Furthermore, mechanically movable filter devices are obviously unsatisfactory for the dot multiplex type of color television system as such rapid change in color requires electronic devices for color selection and control.

In order to obviate disadvantages of the character described, it also has been proposed to effect the reproduction of the several color components of the image by means of a plurality of cathode ray image reproducing devices popularly known as the kinescope. While such systems have met with sufficient success to warrant their use in commercially practical television receivers, they require an individual image reproducing device for each of the color components of the image to be reproduced.

Accordingly, the principal object of the present invention is to provide an improved color television reproducing system employing a single cathode ray tube for the reproduction of the primary color components of an image.

Another object of the invention is to provide an improved form of cathode ray tube by means of which a plurality of different color components of an image may be reproduced.

Still another object of the invention is to provide an improved color television image reproducing system embodying a single cathode ray tube having a novel electrode structure by means of which to selectively control the movement of an electron beam over a luminescent screen of such a character that differently colored light is emitted from different areas thereof when excited by the electron beam.

A further object of the invention is to provide an improved color television image reproducing system in which is embodied a cathode ray tube having a novel color-selecting electrode whereby, in addition to the conventional deflection of the beam over a fluorescent screen, the beam is selectively deflected to impinge upon sub-elemental areas of the screen capable respectively of emitting differently colored light.

According to this invention, a television image is reproduced substantially in its natural colors by the use of a single cathode ray tube by deflecting an electron beam in a predetermined pattern over a luminescent screen having individual areas thereof capable of emitting light of different colors. The intensity of the beam is modulated in accordance with video signals representative of a plurality of color components of the image to be reproduced. The velocity of the scanning beam is selectively varied to effect an additional color-selecting deflection thereof, whereby to excite the individual screen areas.

The improved color television image reproducing system comprises a cathode ray tube provided with a luminescent screen having a plurality of groups of areas which are capable respectively of emitting differently colored light. The tube also is provided with a novel electron beam-controlling electrode by means of which to effect the controlled impingement of the electron beam upon selected ones of the screen areas. The system also includes means for receiving composite television signals and for employing the video signal component to modulate the intensity of the electron scanning beam. There is further provided means operative concurrently with the color changes of the video signals for varying the velocity of the electron beam so that it is deflected onto a particular screen area capable of emitting light of the color represented by the video signal by which the intensity of the beam is modulated at that instant.

In accordance with one feature of the invention, the cathode ray image reproducing tube is provided with an apertured electrode located in the path of the electron beam and having a configuration such that energization thereof produces a plurality of electric fields transversely of the path of the beam. As a result, the electron beam, in traversing any of the fields produced in the vicinity of the electrode apertures, is variably deflected depending upon the velocity of the beam. Further, in accordance with the invention, the potential of the apertured electrode relative to the source of the electron beam is varied so as to produce the velocity variation of the beam.

In accordance with another particular feature of the invention, the apertured electrode by means of which the electron beam velocity is varied has a configuration such that the apertures thereof are of an asymmetric character. By suitably impressing potentials of predetermined magnitudes upon the apertured electrode and the luminescent screen, there is produced a field therebetween which, in the vicinity of the electrode apertures, is distorted in such a manner as to produce a transverse component. The field distortion is produced by means of the asymmetric character of the electrode apertures. By using electrode structures of this character, it is not necessary to provide energizing potentials for the particular purpose of producing the fields in the vicinity of the apertures.

The effective potential between the apertured electrode and the source of the electron beam may be varied in any desired manner, such as by modifying the potential applied to the apertured electrode while maintaining that of the electron beam source constant or by maintaining the potential of the apertured electrode constant and varying the potential of the electron beam source. As a further feature of the invention, in cases where the potential impressed upon the apertured electrode is varied, there may also be provided means for correspondingly varying the potential of the luminescent screen in order to maintain a field between these two electrodes which is substantially constant in intensity.

The present invention also may include means for providing a plurality of electron beams, each of which has a velocity which is different from the others. In such a case, it is not necessary to provide means for varying the potential of either the apertured electrode or the electron beam source. It is, however, necessary to provide means for switching from one electron beam to another for the production of the different image color components. Such a system also necessitates the concurrent deflection of all of the beams and requires that proper registration of the beams be effected in the plane of the luminescent screen.

The novel features that are considered characteristic of this invention are set forth with particularity in the appended claims. The invention itself, however, both as to its organization and method of operation, as well as additional objects and advantages thereof, will best be understood from the following description taken in connection with the accompanying drawings, in which:

Figure 1:
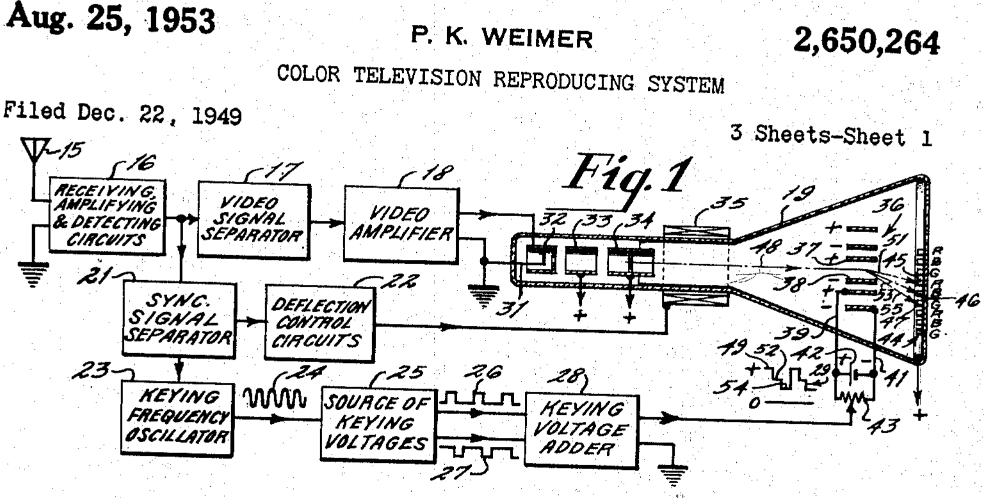
Figure 1 is a circuit diagram in block form illustrating a color television image reproducing system embodying the invention.

Referring first to Figure 1 of the drawings, the color television reproducing system in accordance with the present invention will be generally described. There is provided an antenna 15 which may be coupled to conventional receiving, amplifying and detecting circuits 16 by means of which the received carrier wave is ultimately detected so as to produce the modulating signal component comprising a composite television signal including video signals representative of a plurality of color components of the image to be reproduced and the usual system control signals, such as blanking and synchronizing signals. The output of the signal detector circuit is coupled to a video signal separator 17 by means of which the video signal component is recovered to the exclusion of the system control signals. The video signal separator is coupled to a video signal amplifier 18, the output circuit of which is coupled to the electron beam intensity control system of a cathode ray image reproducing tube 19.

The output of the signal detector circuit 16 also is coupled to a synchronizing signal separator 21 by means of which the horizontal and vertical synchronizing signals are recovered to the exclusion of the video signal component. The synchronizing signal separator is coupled to the deflection control circuits 22, the output circuit of which is coupled to the deflecting system of the cathode ray tube 19 in a conventional manner. The synchronizing signal separator 21 also is coupled to a keying frequency oscillator 23 which preferably is one capable of developing a sinusoidal voltage at the desired frequency and is susceptible of synchronizing control by means of impulses derived from the synchronizing signal separator 21. A representative form of the oscillator 23 may be one such as that shown, for example, in the book entitled "Wave Forms" published in 1949 by the McGraw Hill Book Co., Inc., at page 143, Figure 4—45.

The frequency at which the oscillator 23 is required to operate is that at which the color changes of the image to be reproduced is effected. For example, in a system wherein complete fields of different colors are transmitted sequentially, the oscillator 23 will develop a sine wave voltage having the field frequency. In a system in which the color changes are effected in sequential horizontal lines of the image to be reproduced, the oscillator 23 will develop a voltage having the line frequency. In a system which will be treated herein as a preferred form of the invention, wherein the color video signals are changed for every dot or elemental area of the image to be reproduced, the oscillator 23 is required to develop a voltage having the dot frequency of the reproduced image. Such a system is presently referred to as one which operates according to the dot multiplex principle and forms the subject matter of a copending United States application of John Evans, Serial No. 111,384, filed August 20, 1949, and entitled "Color Television."

The sinusoidal voltage developed in the output circuit of the keying frequency of the oscillator 23 is represented at 24 and is impressed upon a source of keying voltages 25. The circuit details of this circuit component will be treated more fully hereinafter. There may be derived from the keying voltage source 25 two voltages having generally the waveforms shown at 26 and 27. These voltages are impressed upon keying voltage adder 28, the details of which will be more fully disclosed subsequently to develop a stepped wave voltage such as represented at 29. This voltage is required to have an amplitude-change frequency corresponding to the color-change frequency of the received video signals.

The cathode ray image reproducing tube 19 is provided with a conventional electron gun structure including a cathode 31 and electron beam intensity control electrode 32, an electron accelerating electrode 33 and a beam-forming or first anode 34. The output circuit of the video amplifier 18 is coupled to the electrodes 31 and 32 of the cathode ray tube 19 in a conventional manner, whereby to vary the electron intensity of the beam in accordance with the video signals. The electrodes 33 and 34 have impressed thereon suitable positive potentials in a manner well known to those skilled in the art. The tube 19 also is provided with a beam-deflecting system which, in this instance, is represented as an electromagnetic yoke 35. The electron beam-deflecting fields produced by the deflecting yoke are varied in a well known manner under the control of saw-tooth voltages derived from the deflecting control circuits 22 to which the yoke is coupled as shown.

The cathode ray tube 19 also is provided with an apertured electrode which may be energized to selectively deflect the beam onto different areas of a luminescent screen capable respectively of emitting light of different colors. In this embodiment of the invention, the color-selecting electrode 36 comprises a plurality of spaced plates such as 37 and 38. Only a few of such pairs of plates have been shown in this figure in order to simplify the drawing. It will be understood, however, that there is provided at least as many pairs of plates as there are horizontal lines in the image to be reproduced. Preferably, the color-selecting electrode includes a plurality of pairs of plates for each horizontal image line. These plates may be formed in a manner such as that shown in Figure 2. One set of plates such as 37 may be supported by a vertically extending member 39 and the alternate plates 38 by a vertical member 41. In this manner, corresponding ones of each pair of plates are connected together electrically so that the supporting members 39 and 41 may be connected externally of the tube to a suitable voltage source such as represented by a battery 42 in such a manner that the plates 37 are of positive potential with respect to the plates 38. Inasmuch as there is a constant spacing between the plates of all pairs and the same voltage is impressed upon all pairs of plates, there is produced an electrostatic field between each pair of plates which is uniform for all pairs. There also is connected to the terminals of the voltage source 42 a potentiometer 43, an intermediate point of which is coupled to the keying voltage adder 28 as shown. By virtue of this circuit arrangement, the potential of the color-selecting electrode 36 may be varied with respect to a reference potential such as ground to which the cathode 31 is connected, while at the same time maintaining a constant field distribution between all pairs of plates 37 and 38.

The cathode ray tube 19 also is provided with a fluorescent screen 44 which consists of a plurality of groups of areas or horizontal strips such as those represented at 45, 46 and 47. Each individual fluorescent area of a group is capable of emitting light of a different color. In one embodiment of the invention, the fluorescent screen 44 may take the form shown in Figure 3. Each group of the strips such as 45, 46 and 47 preferably has a sub-elemental width and a length extending entirely across the face of the cathode ray tube. The elongated areas 45, 46 and 47 are formed of phosphors capable, respectively, of emitting red, blue and green light, for example, when excited by an electron beam. While, in this embodiment of the invention, it is not absolutely essential to impress a potential upon the screen 44, it may be desirable to do so as indicated in Figure 1. In certain other of the illustrative embodiments of the invention disclosed herein, it is necessary that the screen be energized. Accordingly, it is contemplated that the cathode ray tube 19 be provided with a screen having a metallic layer formed thereon which should be sufficiently thin to be electron pervious if placed on the back side of the screen or transparent if placed on the front side of the screen. Such a tube is disclosed in the March 1946, volume VII issue of the RCA Review at page 5 in an article entitled "Improved cathode-ray tubes with metal-backed luminescent screens" by D. W. Epstein and L. Pensok. In the present instance it may be convenient to electrically connect the metallic layer to the usual metallic wall coating with which the tube is provided.

Figure 2:
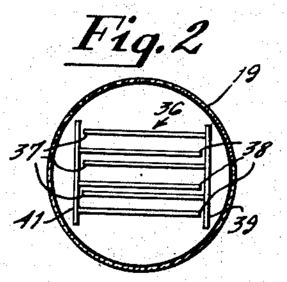
Figure 2 is an enlarged fragmentary view of an improved form of color-selecting electrode in accordance with the invention and embodied in a cathode ray tube.
Figure 3:
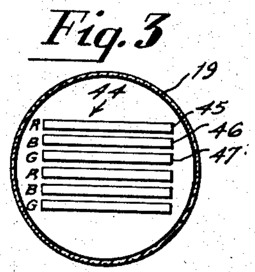
Figure 3 is another fragmentary view of a typical fluorescent screen electrode forming part of the cathode ray image reproducing tube.

Referring now to the general operation of the color television reproducing system shown in Figures 1, 2 and 3, it will be assumed that the video signals are being transmitted and received in accordance with the dot multiplex system referred to. Accordingly, it will be understood that the received video signals successively represent respectively the component primary colors of each elemental area of the image. While the particular order in which these signals are received is immaterial, it will be assumed that, in the present instance, they are received in the order of red, blue and green. Accordingly, when the video signal representing the red component of the first elemental image area, for example, is received and applied to the control electrode 32 of the cathode ray tube 19 to modulate the intensity of the electron beam represented at 48, the keying voltage 29 is at maximum amplitude represented by the step 49. The color-selecting electrode 36, therefore, has impressed thereon a positive potential of maximum magnitude relative to the cathode 31. As a consequence, the electron beam 48 has a maximum velocity as it approaches the color-selecting electrode 36. The electrostatic field which is produced between a pair of the color-selecting electrode plates such as 37 and 38 has an intensity such that at this velocity of the electron beam it is deflected by the electrode 36 by a minimum amount as represented at 51. As a result, it is caused to impinge upon a phosphor strip, such as 45, capable of emitting red light.

At the next succeeding instants the received video signal represents the blue color component of the elemental area of the image and the electron beam 48 is modulated in intensity accordingly. At this time, however, the keying voltage 29 has an amplitude such as represented by the step 52 so that the positive potential of the color-selecting electrode 36 is of somewhat smaller magnitude relative to the cathode 31 than in the case previously described. Consequently, the velocity of the electron beam 48 as it approaches the color-selecting electrode is less than in the preceding instance. Since the intensity of the field produced by each pair of the color-selecting electrode plates, such as 37 and 38, is the same as the preceding case, the electron beam is deflected through a greater angle than previously as indicated at 53. As a result, the beam is caused to impinge upon the phosphor strip 46, whereby to emit blue light from the fluorescent screen.

Similarly, in the next succeeding instant, the received video signal which is impressed upon the intensty control electrode 32 represents the green color component of the elemental image area being considered, whereby the intensity of the electron beam 48 is modulated accordingly. At this time, the keying voltage 29 has an amplitude represented by the step 54 so that the velocity of the electron beam 48 as it approaches the color-selecting electrode 36 is less than in either of the preceding instances. Consequently, since the electrostatic field between the plates 37 and 38 is unchanged, the beam is deflected through a still greater angle such as represented at 55. In this case, the beam is caused to impinge upon the phosphor strip 47, whereby the fluorescent screen 48 emits green light.

This cycle of operation is continued for each of the succeeding elemental areas of the horizontal line of the fluorescent screen 44 being scanned by the beam 48. It will be understood, of course, that in addition to the color-selecting deflections given to the electron beam by the color-selecting electrode 36, the beam 48 is deflected over the fluorescent screen 44 in the conventional manner, whereby the screen is scanned in a series of substantially horizontal lines, each from left to right, for example, and successively from top to bottom. During each horizontal deflection of the beam 48 over the fluorescent screen 44, it is caused to pass between at least one pair, and preferably a plurality of pairs, of plates, such as 37 and 38. Accordingly, the vertical deflection of the beam 48 will cause it to traverse successive pairs of color-selecting deflecting plates.

It will be apparent that, while the foregoing detailed description of the operation of a television image reproducing system in accordance with the present invention has been given with reference to the so-called dot multiplex system of color television, the same cathode ray tube structure may be also employed with substantially equal facility for the reproduction of color television images in either a line sequential system or a field or frame sequential system. The only modification that is required is that relating to the timing of the steps of the keying voltage wave 29. In the dot multiplex color television system, the amplitude of the wave 29 is varied at a rate which is substantially equal to three times the rate at which it is desired to reproduce the three-color elemental image areas. In a line sequential system of color television, the rate at which the amplitude of the keying voltage wave 29 is varied is equal substantially to the horizontal line frequency. In a field or frame sequential system of color television, the amplitude of the keying voltage wave 29 is varied at a rate which is substantially equal to the field or frame frequency.

It also will be apparent that the present system is susceptible of operation without modification of the described tube structure and with only obvious modifications of the control circuits for effecting line interlacing of the image to be reproduced according to any desired pattern. Furthermore, it is susceptible of use in connection with any desired form of dot interlacing such as those shown and described in the copending United States applications of Randall Ballard, Serial No. 117,528, filed September 24, 1949, and entitled "Color Television Systems" and Alfred G. Schroeder, Serial No. 117,593, filed September 24, 1949, and entitled "Color Television."

Figure 4:
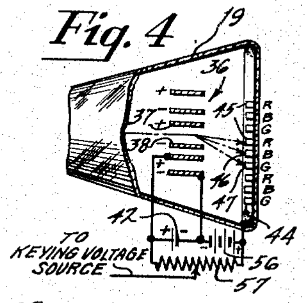
Figure 4 illustrates another control circuit arrangement for the fluorescent screen and a color-selecting electrode with which the cathode ray tube may be provided in accordance with the invention.

In the foregoing description of the embodiment of the invention shown in Figures 1, 2 and 3, it was assumed that the positive potential of the fluorescent screen 44 relative to the cathode 31 was maintained substantially constant while the potential of the color-selecting electrode 36 was varied relative to the cathode. As a consequence of this type of operation, it is seen that there also is effected a variation in the potential between the fluorescent screen and the color-selecting electrode which, in some cases, may not be entirely desirable. The present invention is of such a character that it is not necessarily limited to such type of operation. An alternative arrangement is illustrated in Figure 4. The plates such as 37 and 38 of the color-selecting electrode 36 are maintained at suitable constant potentials relative to one another by means of a source of voltage such as represented by the battery 42 as in the previously described form of the invention. In this case, a suitable positive potential is impressed upon the fluorescent screen 44 by a voltage source such as represented by the battery 56, the negative terminal of which, instead of being connected to ground as in the preceding instance, is connected to the voltage source 42. Also, in this instance, there is provided a potentiometer 57 connected across both of the voltage sources 42 and 56 and having an intermediate point thereof connected to the source of keying voltage as in the previously described embodiment of the invention. Therefore, under the control of the keying voltage, not only is the potential of the color-selecting electrode 36 varied relative to the cathode 31 of the image reproducing tube, but also the potential of the fluorescent screen is correspondingly varied. As a result, the fluorescent screen and the color-selecting electrode are maintained at a substantially constant potential relative to one another, thereby creating an electrostatic field between these two electrodes which is substantially constant in intensity. In many cases, an arrangement of this character will effect a somewhat improved performance of the system.

Figure 5:
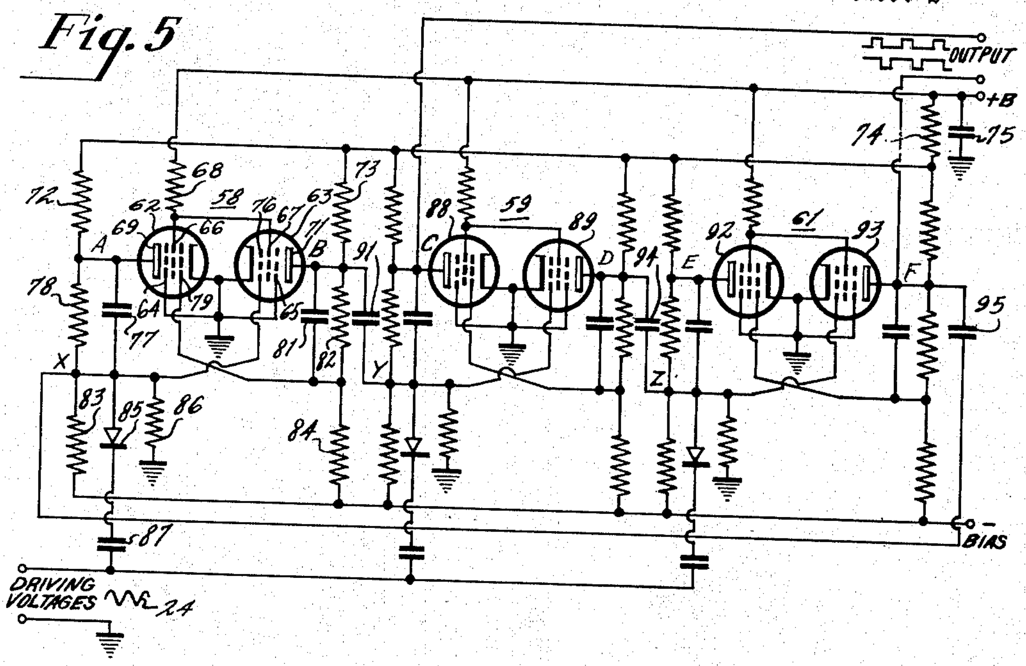
Figure 5 is a detailed circuit diagram of one of the circuit components of the television reproducing system shown in Figure 1.

In order to more completely understand the manner in which the improved color television image reproducing system in accordance with this invention operates, reference will now be made to Figure 5 which illustrates the circuit details of typical apparatus which may be used as the source of keying voltages 25 generally indicated in Figure 1. Essentially, it is a type of circuit which is commonly known as a ring multivibrator. It comprises as many multivibrators as there are primary color components in the image to be reproduced. In the present three-color television system, there are provided three multivibrators 58, 59 and 61. Inasmuch as these multivibrators are identical, only one will be described in detail.

The multivibrator 58 comprises a pair of vacuum tubes 62 and 63 which, in the present instance, are pentodes. The cathodes and suppressor grids 64 and 65 respectively of the tubes 62 and 63 are connected to ground, as shown. The screen grids 66 and 67 of the tubes 62 and 63, respectively, are connected together and, through a common voltage dropping resistor 68, to a source of positive voltage indicated at +B. The anodes 69 and 71, respectively, of the tubes 62 and 63 are connected through individual load resistors 72 and 73 to +B through a common voltage dropping resistor 74 and the +B terminal is bypassed to ground by a capacitor 75.

The anode 69 of the tube 62 is cross-coupled to the control grid 76 of the tube 63 by a network including the parallel connection of a capacitor 77 and a resistor 78. Similarly, the anode 71 of the tube 63 is cross-coupled to the control grid 79 of the tube 62 by a network including the parallel connection of a capacitor 81 and a resistor 82. Negative biasing voltages are impressed upon the control grids 76 and 79 of the tubes 63 and 62, respectively, by means of resistors 83 and 84, respectively, connected to a suitable voltage source indicated at —Bias. The control grid 76 of the tube 63 is coupled to the terminals of the keying frequency oscillator 23 by means of a circuit which includes a unilaterally conducting device such as a crystal diode 85, shunted to ground by a resistor 86, and a coupling capacitor 87. By means of the polarity in which the diode 85 is connected in the circuit, only the negative half cycles of the sinusoidal voltage wave 24 derived from the keying frequency oscillator 23 are effective upon the control grid 76 of the tube 63. The parameters of the coupling circuit together with the negative biasing potential impressed upon the control grid 76 are of such a character that preferably only the peaks of the negative half cycles are effective to control the multivibrator 58. The multivibrator 58 may be considered to have an input terminal X connected to the control grid 76 of the tube 63 and two output terminals A and B connected respectively to the anodes 69 and 71 of the tubes 62 and 63.

The multivibrator 59 includes tubes 88 and 89 provided with circuit connections similar to those provided for the tubes of the multivibrator 58. It also is provided with an input terminal Y and two output terminals C and D similar to corresponding terminals of the multivibrator 58. The output terminal B of multivibrator 58 is coupled by a capacitor 91 to the input terminal Y of multivibrator 59.

Multivibrator 61 comprises tubes 92 and 93 and has an input terminal Z and two output terminals E and F. The output terminal D of multivibrator 59 is coupled by a capacitor 94 to the input terminal Z of multivibrator 61. The output terminal F of multivibrator 61 is coupled by a capacitor 95 to the input terminal X of multivibrator 58.

Voltage impulses having substantially rectangular waveforms may be derived from any of the output terminals of the respective multivibrators 58, 59 and 61. For the purpose of controlling the operation of the color-selecting electrode such as 36 of Figure 1, the voltages developed at the output terminals C and F of multivibrators 59 and 61, respectively, are employed.

In order to fully understand the operation of the ring multivibrator illustrated in Figure 5, additional reference will be made to the waveforms shown in Figure 6. A cycle of operation will be assumed to begin at a time when the following conditions exist: tubes 71, 88 and 92 of multivibrators 58, 59 and 61, respectively, are in a conducting state and the other tubes are in a non-conducting state. As a result, in addition to the constant negative biasing voltage impressed upon the control grids of the tubes 71, 89 and 93, there is a negative potential impressed upon the control grid of the tube 89 of the multivibrator 59 as a result of the conduction of space current in the tube 71 of multivibrator 58. The curves 96, 97, 98, 99, 101 and 102 indicate respectively the voltages developed at the output terminals A to F of the multivibrators 58, 59 and 61. The curve 103 represents the sinusoidal waveform derived from the keying frequency oscillator 23 in its time relation to the voltages developed at the output terminals of the multivibrators.

The peak 104 of the negative half cycle of the wave 103 next occurring following the time assumed for the starting of the cycle impresses a negative voltage on the control grids of the multivibrator tubes 63, 89 and 93. Since the tubes 89 and 93 are non-conducting, this negative driving voltage has no effect on these tubes. However, the impression of this negative driving voltage impulse upon the control grid of the conducting tube 63 serves to trigger it to a non-conducting state. By reason of the cross-coupling between the anode 71 of the tube 63 and the control grid 79 of the tube 62, this latter tube becomes conducting substantially instantaneously in accordance with well known multivibrator operation. As a result, the voltage at the output terminal B becomes more positive as indicated by the curve 97 and the voltage at the output terminal A becomes less positive as indicated by the curve 96. The impression of the positive voltage impulse developed at the output terminal B upon the input terminal Y of the multivibrator 59 causes the previously non-conducting tube 89 to become conducting. By virtue of the cross-coupling between the anode of the tube 89 and the control grid of the tube 88, the latter tube becomes non-conducting. As a result, there is developed at the output terminal C of the multivibrator 59 a more positive voltage as indicated by the curve 98 and the voltage developed at the output terminal D is less positive as indicated by the curve 99.

At the occurrence of the next succeeding negative voltage peak 105 of the driving voltage wave 103, current conduction in the tube 89 is interrupted and, as a result, current conduction in the tube 88 is again initiated. The positive voltage developed at the output terminal C is decreased, as indicated by the curve 98 and the positive voltage developed at the output terminal D is increased as indicated by the curve 99. The impression of the increased positive voltage developed at the output terminal D upon the input terminal Z of the multivibrator 61 causes the tube 93 to become conducting, which terminates current conduction in the tube 92. As a result, the positive voltage developed at the terminal E of the multivibrator 61 increases as indicated by the curve 101 and the positive voltage developed at the output terminal F decreases as indicated by the curve 102.

The next negative voltage peak 106 of the curve 103 causes the tube 93 of the multivibrator 61 to become non-conducting, which initiates current conduction in the tube 92, whereby the voltage developed at the output terminal E decreases in positive magnitude as indicated by the curve 101 and the voltage developed at the output terminal F increases as indicated by the curve 102. The increased positive voltage developed at the output terminal F is impressed upon the input terminal X of multivibrator 58 to again initiate current conduction in the tube 63, which results in the termination of current conduction in the tube 62. The described cycle of operation then is repeated.

For the purpose of developing a control voltage suitable for impression upon the color-selecting electrode 36 of the cathode ray tube 19 of Figure 1, the voltages developed at the output terminals C and F of the ring multivibrator are employed. These voltages are represented by the curves 98 and 102 of Figure 7 and are impressed upon the keying voltage adder 28 of Figure 1.

Figures 6, 7:
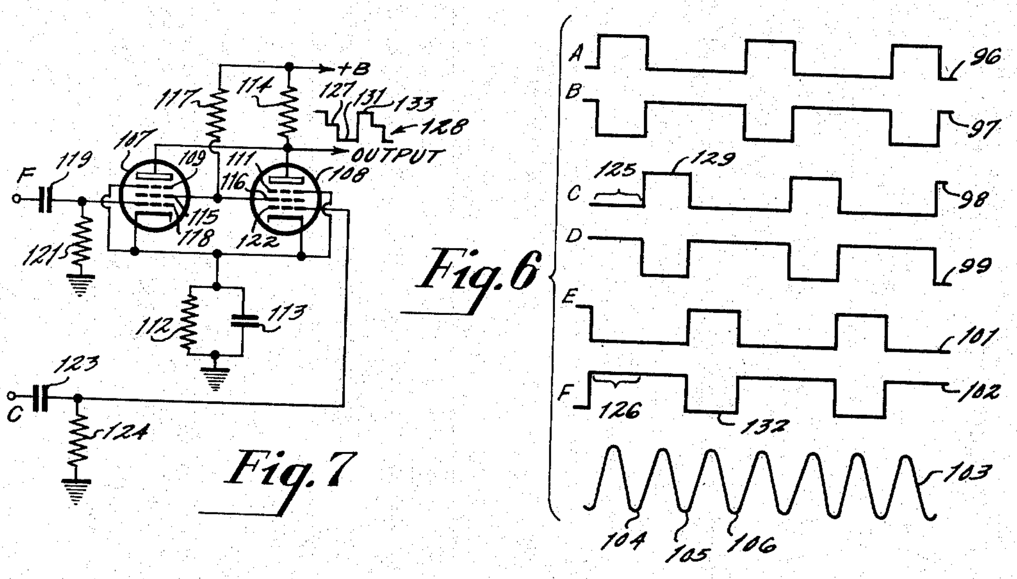
Figure 6 is a series of curves representing voltage waveforms developed at different points of the circuit of Figure 5.
Figure 7 is a detailed circuit diagram of another component of the reproducing system shown in Figure 1.

Having reference now to Figure 7 of the drawings, there are shown the details of a typical circuit arrangement which may be employed as the keying voltage adder 28 of Figure 1. It comprises a pair of electron tubes 107 and 108 which, for example, may be pentodes as shown. The cathodes and the suppressor grids 109 and 111, respectively, of the tubes 107 and 108 are connected together and to ground through a common self-biasing circuit including a resistor 112 and a bypass capacitor 113. The anodes of the tubes are connected together and through a common load resistor 114 to a source of space current indicated at +B. The screen grids 115 and 116 of the tubes 107 and 108, respectively, are connected together and through a common voltage-dropping resistor 117 to +B. The control grid 118 of the tube 107 is coupled by a capacitor 119 and a leak resistor 121 to the output terminal F of the ring multivibrator of Figure 5. The control grid 122 of the tube 108 is coupled by a capacitor 123 and a leak resistor 124 to the output terminal C of the multivibrator 59 of Figure 5.

Consequently, a voltage having a waveform such as that shown by the curve 102 of Figure 6 is impressed upon the control grid 118 of the tube 107 and a voltage having a waveform such as that shown by the curve 98 of Figure 6 is impressed upon the control grid 122 of the tube 108. An inspection of the curve 98 will show that there is developed a series of impulses of positive polarity, each having a width or time duration of one unit with a space or time interval of two units between successive impulses. Similarly, an inspection of the curve 102 will show that there is developed at the output terminal D a series of impulses of negative polarity and each having a width or time duration of one unit with a space or time interval between successive impulses of two units. A comparison of the time relationship between the positive impulses of the curve 98 and the negative impulses of the curve 102 shows that the respective impulses are not developed concurrently and that there is a time interval of one unit during which there are no impulses developed at the output terminals C and F.

In considering the operation of the keying voltage adder shown in detail in Figure 7, it will be understood that during the intervals during which no voltage impulses are developed at the multivibrator output terminals C and F as indicated at 125 and 126, respectively, of the curves 98 and 102 of Figure 6, both of the adder tubes 107 and 108 are conducting space current of an intermediate magnitude. Under these conditions, the voltage developed at the anodes of these tubes is represented by the step 127 of the curve 128 which is the waveform of the voltage developed at the output terminal of the adder. During the succeeding time interval during which the positive impulse 129 of the curve 98 is impressed upon the control grid 122 of the tube 108, this tube conducts space current of a maximum magnitude while the tube 107 continues to conduct space current of the intermediate magnitude. The resultant voltage drop through the load resistor 114 develops a voltage represented by the step 131 of the curve 128. During the next succeeding interval, the negative impulse 132 of curve 102 is impressed upon the control grid 118 of adder tube 107 with the result that this tube is caused to conduct space current of a minimum magnitude while the tube 108 conducts space current of intermediate magnitude. The resultant voltage drop produced across the load resistor 114 produces a voltage at the output of the adder such as represented by the step 133 of curve 128. The described cycle of operation is then repeated. It will be seen that the waveform of the voltage represented at 128 is that which is required to vary the potential of the color-selecting electrode 36 of Figure 1.

It is to be understood that the embodiment of the present invention which has been described is merely illustrative of many alternative embodiments which may be employed within the scope of the invention. The color-selecting electrode 36 in the form of plates as shown in Figures 1 and 2 requires an additional source of potential for the establishment of the necessary electrostatic fields between the different pairs of plates. Other embodiments of the invention, some of which are to be described, employ color-selecting electrodes which do not require a separate source of field-producing potential. In order for a color-selecting electrode to function in accordance with this invention, it is necessary that the electron beam, in traversing the apertures of the selecting electrode, be influenced by a field of such a character that it has at least a component in a transverse direction to that in which the beam is travelling. The plate structure of the color-selecting electrode 36 is of such a character that substantially the entire field produced thereby is in a transverse direction relative to the path of the electron beam. As a feature of the present invention, there is provided a form of color-selecting electrode which has asymmetric apertures by means of which it is possible to produce a field having a component in a transverse direction to the path of the electron beam.

Figures 8, 9, 10, 11, 12, 13:
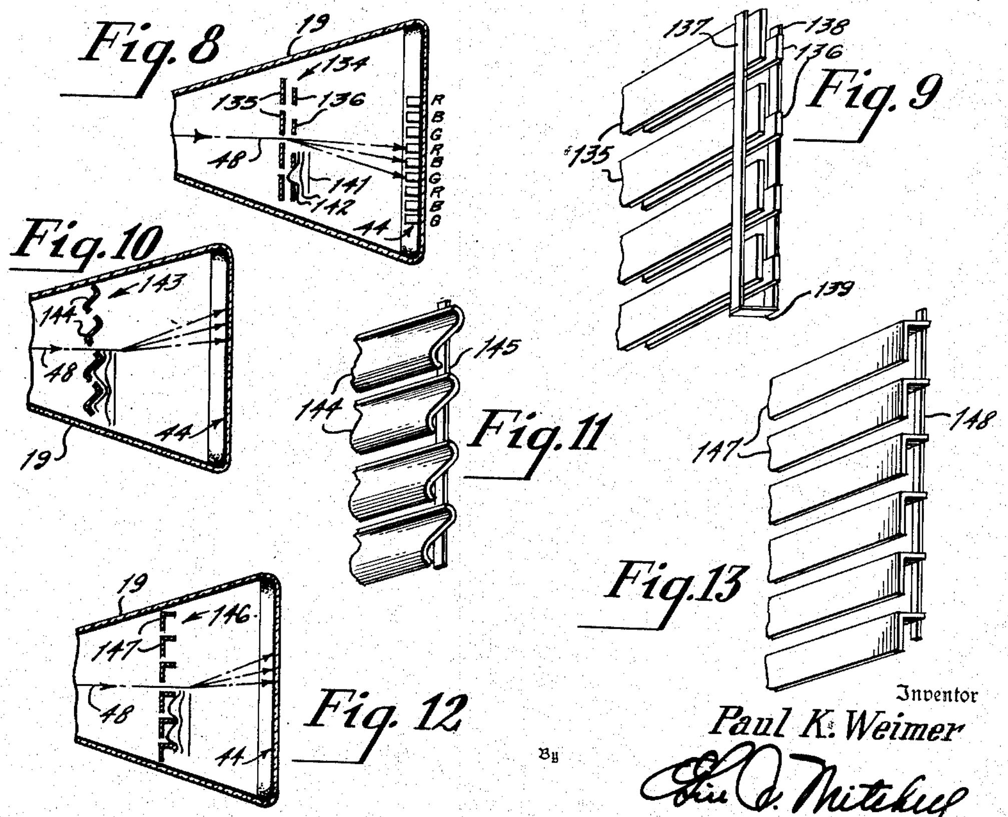
Figures 8 and 9 illustrate sectional and perspective views, respectively, of an alternative form of a color-selecting electrode for an image reproducing tube in accordance with this invention.
Figures 10 and 11 illustrate still another form of color-selecting electrode for use in the present system.
Figures 12 and 13 illustrate another alternative form of color-selecting electrode for use in the present system.

One such color selecting-electrode 134 is illustrated diagrammatically in Figure 8 of the drawings. This electrode consists essentially of a plurality of bars or wires, such as 135, extending in parallel relationship horizontally in the tube. These bars are spaced apart suitably to define apertures through which the electron beam 48 is directed. The electrode 134 also includes a plurality of smaller bars or wires, such as 136 spaced from the bars 135 on the fluorescent screen side of the aperture-defining bars 135. The bars 136 are displaced vertically in an asymmetric manner relative to the apertures defined by the bars 135 substantially in the manner shown.

Figure 9 illustrates one manner in which the color selecting electrode 134 may be made. The view of this electrode shown in this figure is a perspective as the electrode 134 would be viewed from a point on the electron gun side and looking generally in an upward direction. The aperture defining bars 135 may be formed by a screen or grid type of structure such that the horizontal bars are supported in spaced relationship by means of a plurality of vertical supporting members, such as 137. Similarly, the asymmetric bars 136 may form part of a similar screen or grid structure in which the bars are supported by a plurality of vertical supporting members such as 138. The supporting members 137 and 138 may be joined together at one or more points by cross members such as 139.

Although not specifically shown in the fragmentary view of Figure 8, it will be understood that there is impressed upon the color-selecting electrode 134 a voltage of positive polarity relative to the cathode of the electron gun, the magnitude of which is varied for color selecting purposes. It will be understood that there is impressed upon the fluorescent screen 44 a higher positive potential. These potentials may be applied and varied in suitable manner, such as illustrated and described with reference to Figures 1 and 4. By reason of the potential difference between the fluorescent screen 44 and the color-selecting electrode 134, there is produced in the intervening space an electrostatic field. The character of this field is indicated in Figure 8 by means of representative equipotential lines. Except in the immediate vicinity of the apertures of the color-selecting electrode 134, the equipotential lines are substantially parallel to the plane of the color-selecting electrode. Such an equipotential line is indicated at 141. As a result of the asymmetric character of the apertures of the electrode 134, the equipotential lines in the immediate vicinity of the apertures are distorted somewhat, as indicated generally by the lines 142. It will be seen, therefore, that within the asymmetric apertures of the color-selecting electrode 134 the field which exists between it and the fluorescent screen 44 has a component which is transverse to the general direction in which the electron beam is moving through the apertures. This transverse field component is effective to deflect the electron beam through an angle which depends upon the velocity of the beam. As in the previously described embodiment of the invention, the electron beam velocity is varied by varying the potential of the color-selecting electrode 134 relative to the cathode of the electrode gun. In this manner, the electron beam is caused to impinge upon selected areas of the fluorescent screen 44 which are covered by phosphors capable of emitting light of different colors.

Another form of color-selecting electrode is illustrated in Figures 10 and 11. The apertured electrode 143 in this case consists of a plurality of horizontal strips, such as 144, having cross sections which, as indicated, are substantially S-shaped. These may be mounted in spaced relationship so as to form asymmetric apertures substantially as shown by means of a plurality of vertical supporting members, such as the bar 145 in Figure 11. The color-selecting electrode 143 may be energized in substantially the same manner as any of the previously described color-selecting electrodes, whereby to produce a field which, in the immediate vicinity of the apertures has a transverse component which is effective to deflect the electron beam 48 substantially as described.

In Figures 12 and 13 is shown still another form of a color-selecting electrode 146. It comprises a plurality of horizontally extending strips 147 having substantially right angular cross sections. These angular strips may be mounted within the tube 19 in spaced relationship so as to define asymmetric apertures by means of a plurality of supporting members, such as 148. The electrode 146 may be energized in the manner described so as to produce a field component which is transverse to the path of the electron beam, whereby the beam is deflected in the manner described for color-selecting purposes.

It is to be understood that the invention is not necessarily limited to embodiments thereof employing a color-selecting electrode having apertures which are of an elongated character arranged so as to be substantially parallel to the direction of horizontal image scansion. Alternatively, the elongated apertures may be disposed substantially at right angles or, in fact, substantially at any angle relative to the direction of horizontal scansion. Assume that in Figure 10, for example, the electron beam 48 is deflected horizontally substantially in the plane of the drawing. The elongated apertures of the color-selecting electrode 143 are disposed substantially perpendicularly to the plane of the drawings and similarly, the sub-elemental phosphor strips of the luminescent screen 44 are arranged at right angles to the plane of the drawing. It will be seen that, as the electron beam 48 is deflected horizontally over successive apertures of the electrode 143, the velocity thereof is varied as previously described so that the beam is variably deflected for impingement upon selected ones of the sub-elemental phosphor strips. It also will be obvious that substantially any other angular arrangement of the elongated apertures of the color-selecting electrode may be employed in accordance with the invention.

Furthermore, the invention is not limited to the use of color-selecting electrodes in which the apertures have elongated configurations. As a matter of fact, it may be preferable to employ a color-selecting electrode in which the apertures are discrete openings of substantially any configuration such as circular or rectangular apertures. In addition, the sub-elemental areas of the luminescent screen may be minute discrete circular or rectangular areas.

Moreover, in accordance with another feature of this invention, it is not essential that the potential difference between the color-selecting electrode and the electron beam source be varied by means of an abruptly stepped wave voltage. It may be varied sinusoidally, for example. In order to more clearly illustrate these additional features of the invention, reference now will be made to Figure 14 of the drawings.

Figure 14:
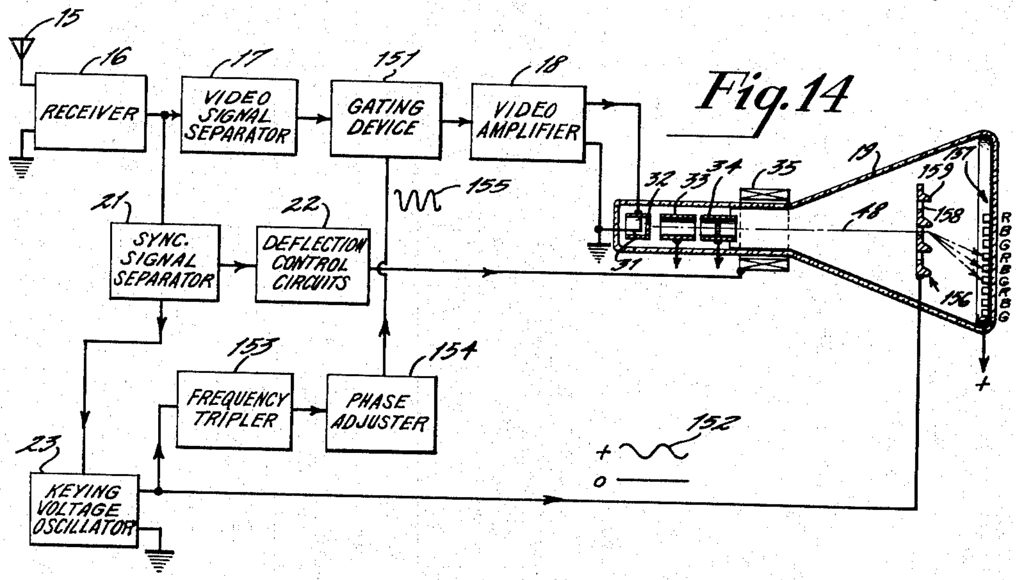
Figure 14 is a block circuit diagram of another color television image reproducing system embodying the invention.

The color television image reproducing system illustrated in Figure 14 is in general similar to that shown in Figure 1 and, therefore, particular emphasis will be given only to the differences in the two systems. A system of this character is particularly useful for dot multiplex operation as disclosed in the copending U. S. application of John Evans referred to, where each elemental area of the image to be reproduced is represented by successive groups of a plurality of time-spaced video signals. While video signals of this character may be employed for image reproducing purposes with any of the previously described embodiments of the invention by impressing the received video signals directly upon the intensity control electrode of the cathode ray image reproducing tube, it is necessary in the present embodiment of the invention to suitably time the impression of the respective video signals upon the electron beam intensity control electrode.

For this purpose, the receiving system employs a gating device 151 coupled in the video signal channel. The details of the gating device have not been specifically shown for the reason that it may be entirely conventional consisting, for example, of one or more electron tubes having an input circuit coupled to the video signal separator 17 and an output circuit coupled to the video amplifier 18 and normally biased beyond cutoff so that video signals are not impressed upon the intensity control electrode 32 of the cathode ray tube 19. At predetermined intervals the biasing of the gating device is suitably altered to render it conducting, whereby the video signal impressed at that time upon the input circuit is also impressed upon the intensity control electrode 32. Another gating device which may be used is similar to that disclosed in U. S. Patent No. 2,563,406, granted August 7, 1951, to E. A. Goldberg and titled "Electronic Commutator." The Goldberg system employs a unilaterally conducting device such as a crystal diode, or a bridge arrangement of a number of such diodes, coupled in series in the signal conveying circuit and suitably biased to periodically render the device conductive.

The system also includes a keying voltage oscillator 23 such as that previously described in connection with the system of Figure 1 and which is capable of producing an output voltage having a substantially sine wave form such as represented at 152 and a frequency equal to the elemental scanning frequency, that is, the frequency at which the multiplicity of elemental image areas are scanned. The output circuit of the keying voltage oscillator 23 is coupled to a frequency multiplier which, in the case of a three color system, is a frequency tripler 153. The voltage produced in the output circuit of the frequency multiplier is impressed upon the control circuit of the gating device 151 by means of a phase adjuster 154 and also is sinusoidal as represented at 155.

Also, in accordance with this embodiment of the invention, the cathode ray tube 19 is provided with a foraminous color-selecting electrode 156 having a plurality of substantially circular apertures which are in effect asymmetric in order to provide the desired distortion of the electrostatic field existing between the electrode 156 and a luminescent screen 157, whereby to effect deflection of the electron beam for color selecting purposes.

Figure 15:
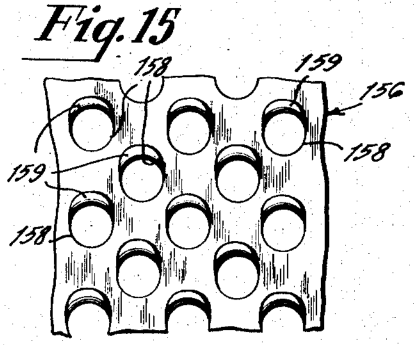
Figure 15 is an enlarged fragmentary view of another typical form of color-selecting electrode in accordance with the invention.
Figure 16:
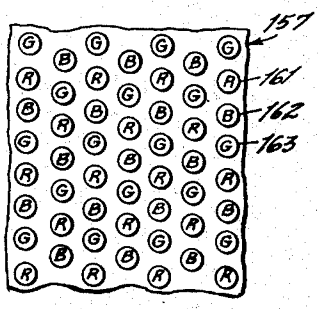
Figure 16 is a fragmentary view to an enlarged scale of another representative form of fluorescent screen structure with which a cathode ray image reproducing tube in accordance with the invention may be provided.

A face view of the color-selecting electrode 156 is shown to an enlarged scale in Figure 15. The apertures such as 158 are substantially circular and the electrode is formed with protuberances such as 159 immediately above each of the apertures so as to effect the desired distortion of the electrostatic field.

The luminescent screen 157 may, if desired, be formed in substantially the same manner as that previously described wherein phosphors capable respectively of emitting light of different colors are arranged in parallel strips either horizontally, vertically or at any other intermediate angles. Alternatively, the luminescent screen 157 may be formed substantially in the manner shown in Figure 16. The different color-emitting phosphors are arranged in this form of screen in discrete areas which, for example, may be circular as shown. A group of discrete phosphor areas is associated with each of the apertures of the color-selecting electrode 156. For example, the aperture 158 of the electrode 156 may have associated therewith the phosphor areas 161, 162 and 163 capable respectively of emitting red, blue and green light when excited by an electron beam.

The color television image reproducing system of Figure 14 operates substantially in the following manner: the potential of the color-selecting electrode 156 is varied relative to the grounded cathode 31 by means of the voltage wave 152 substantially in accordance with a sine function, whereby to correspondingly vary the velocity of the electron beam 48. The electron beam, however, is not continuous but, in accordance with this embodiment of the invention, is keyed at the frequency at which the video signals are changed from one image color to another.

Figure 17:
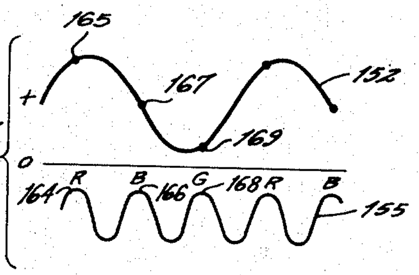
Figure 17 is a series of curves representing typical waveforms of voltages developed and employed in the operation of the color television image reproducing system of Figure 14; and, Figures 18 and 19 illustrate still another alternative form of color-selecting electrode in accordance with the invention.

In order to better understand the operation of this embodiment of the invention, additional reference will be made to Figure 17. The curve 152 represents the voltage impressed upon the color-selecting electrode 156. The curve 155 represents the control voltage impressed upon the gating device 151. The phase adjuster 154 is effective to actuate the gating device 151 at preselected times corresponding to different amplitudes of the voltage wave 152. Assume that the gating device is rendered operative under the control of the positive peaks of the control voltage wave 155. If, by means of the phase adjuster, the positive peak 164 is adjusted to occur at the time when the amplitude of the wave 152 is as represented at 165 and this time coincides with the time of reception of the red video signal, it is seen that the electron beam 48 is modulated in intensity in accordance with the red video signal and, since the color-selecting electrode 156 has impressed thereon a positive potential of appreciable magnitude relative to the cathode 31, the beam velocity is high. Therefore, in traversing the field produced in the vicinity of one of the apertures of the color-selecting electrode 156, the beam is deflected to a minimum degree and is caused to excite a red phosphor screen area. In a three color system, the peak 164 of the wave 155 may be made to occur at the 60 degree point of the cycle of the wave 152.

Consequently, 120 electrical degrees later with reference to the curve 152 the blue peak 166 of the wave 155 is produced and coincides with the point 167 on the wave 152 which is midway between the positive and negative peaks of this wave. As a result, the color-selecting electrode 156 has impressed thereon a voltage of intermediate magnitude, whereby the beam 48 which, at this time is modulated in intensity in accordance with a blue video signal, is deflected to a greater degree than previously and is caused to excite a blue phosphor area.

Similarly, the next positive peak 168 of the wave 155 occurs coincidentally with the reception of a green video signal and at a time represented by the point 169 of the wave 152. As a result, a minimum voltage is impressed upon the color-selecting electrode 156, whereby to cause the deflection of the electron beam for impingement upon a green phosphor area. The described cycle of operation is then repeated for the next succeeding elemental area of the image to be reproduced. It will be seen that, even though the wave 152 impresses a voltage of any given magnitude upon the color-selecting electrode 156 twice during a cycle, the electrode is rendered incapable of exciting the same color phosphor area twice during a cycle of operation by properly phasing the relationship between the waves 152 and 155 substantially in the manner described.

Figure 19:
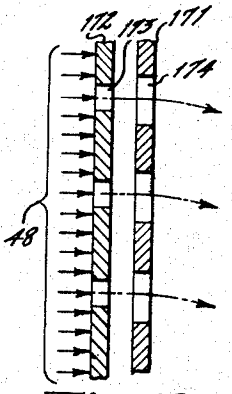
Figure 18:
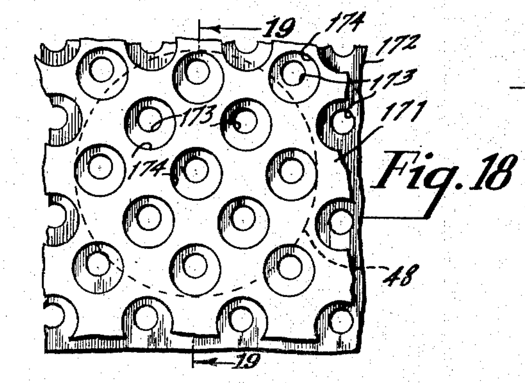

Figures 18 and 19 illustrate still another form of color-selecting electrode in accordance with this invention. In this embodiment the electrode consists of two foraminous members or perforated plates 171 and 172 arranged in spaced parallel relationship substantially as shown in Figure 19. The plate 172 which is on the electron gun side of the electrode is provided with a plurality of small apertures such as 173, whereas the plate 171 which is adjacent to the luminescent screen is provided with a corresponding number of apertures 174 but of somewhat larger size. Each pair of apertures is arranged eccentrically substantially as shown so as to effect the described distortion of the electrostatic field produced between the color-selecting electrode and the luminescent screen.

The apertures need not be circular as shown but, as will be understood by those skilled in the art, may have other configurations such as rectangular or square ones, for example. The apertures may be aligned both vertically and horizontally or they may be staggered substantially as shown in Figure 18. The arrangement of the apertures need not necessarily be according to a regular pattern but alternatively may be entirely random in character. In such a case, the apertured electrode may be employed in the formation of the luminescent screen. It is only necessary that the sub-elemental screen areas be made to correspond with color-selecting electrode apertures.

In order to simplify the description of the apparatus and its mode of operation in conjunction with any of the embodiments of the invention shown and described, reference has been made to the electron beam and the manner in which it is controlled for color-selecting purposes by a single screen aperture. It is to be understood that it is not an essential requirement of the present invention that the electron beam be made to register throughout a given horizontal deflection thereof with only one horizontally arranged elongated aperture or with a horizontal row of a plurality of discrete apertures. Actually, it is preferable that the number of screen apertures be sufficient that, at any one time, a plurality of them is traversed by different portions of the electron beam. A representation of such an arrangement is given in Figures 18 and 19. The broken line circle of Figure 18 represents a typical cross-sectional area of the electron beam 48 as it impinges upon the color-selecting electrode. Only those portions of the electron beam which are in register with the defining apertures of the color-selecting electrode are effective to excite the luminescent screen. It may be seen, therefore, that once the apertures of the color-selecting electrode are suitably registered with the groups of screen areas the electron beam 48 may depart somewhat from a precise linear scansion of the electrode without affecting the color selection operation in accordance with the invention.

While the present invention has been shown and described particularly with reference to a single electron beam, the deflection of which for color selecting purposes is effected by an apertured color-selecting electrode, it will be obvious to those skilled in the art that the principles of the present invention are equally applicable to the control of a plurality of electron beams. The velocities of the respective beams would be different so that they would be differently deflected by the color-selecting electrode. In such a case, however, the potentials impressed between the color-selecting electrode and the cathodes, for example, of the respective electron beams while different for each of the beams would be fixed. It would, therefore, not be necessary to provide a varying amplitude voltage wave for the control of the electron beam velocities as in the particular embodiments of the invention described herein. It would, however, be necessary to key the respective beams on and off in synchronism with the reception of video signals representative of different color components of the image to be reproduced. A representative example of a multiple electron gun arrangement for use in an image reproducing tube in a color television system is shown in U. S. Patent No. 2,481,839, granted September 13, 1949, to A. N. Goldsmith for "Color Television."

Also, it will be obvious to those skilled in the art that the velocity of the electron scanning beam may be varied for color-selecting purposes in accordance with this invention by varying the potential of the cathode, for example, of the electron gun relative to a fixed potential of the color-selecting electrode. Other equally obvious means may be employed for varying the velocity of the electron scanning beam so that it may be variably deflected for color-selecting purposes by an apertured electrode such as any of those shown and described herein or their equivalents.

It will be understood that the invention is not limited to the embodiments thereof which have been disclosed herein for the purpose of illustrating the underlying principles of the invention, the scope of which may be determined from the following claims.

I claim:

1. A color television system, comprising a cathode ray image reproducing tube including a source of an electron beam and a fluorescent screen having a plurality of groups of areas respectively capable of emitting light of different colors when excited by said beam, means responsive to received video signals representative of differently colored light components of the image to be reproduced for modulating the intensity of said beam, means for deflecting said beam according to a predetermined pattern to scan said screen in complete image fields, a source of keying voltage having a frequency corresponding to the color-change frequency of said video signals, means associated with said tube for developing a beam-deflecting field for additionally deflecting said beam in an amount dependent upon the velocity of said beam, and means responsive to said keying voltage to vary the velocity of said beam concurrently with color changes of said video signals, whereby to selectively excite the differently colored light emitting areas of said screen in coincidence with the intensity modulation of said beam in accordance with the different image color components.

2. A color television system, comprising a cathode ray image reproducing tube including a source of an electron beam and a fluorescent screen having a plurality of groups of areas respectively capable of emitting light of different colors when excited by said beam, means responsive to received video signals representative of differently colored light components of the image to be reproduced for modulating the intensity of said beam, means for deflecting said beam according to a predetermined pattern to scan said screen in complete image fields, means for generating a keying voltage having a magnitude varying at a frequency corresponding to the color-change frequency of said video signals, means including an electrode mounted in said tube for developing a beam-deflecting field for additionally deflecting said beam in an amount dependent upon the velocity of said beam, and means responsive to said keying voltage for varying the potential of said field-developing electrode to vary the velocity of said beam concurrently with color changes of said video signals, whereby to selectively excite the differently colored light emitting areas of said screen in coincidence with the intensity modulation of said beam in accordance with the different image color components.

3. A color television system, comprising a cathode ray image reproducing tube including a source of an electron beam and a fluorescent screen having a plurality of groups of areas respectively capable of emitting light of different colors when excited by said beam, means responsive to received video signals representative of differently colored light components of the image to be reproduced for modulating the intensity of said beam, means for deflecting said beam according to a predetermined pattern to scan said screen in complete image fields, means for generating a varying amplitude keying voltage having a frequency corresponding to the color-change frequency of said video signals, means including an electrode located adjacent to the path of said beam for developing a beam-deflecting field of substantially uniform intensity in all elemental portions thereof for additionally deflecting said beam in an amount dependent upon the velocity of said beam, and means responsive to said keying voltage for varying the potential between said field developing electrode and said electron beam source to vary the velocity of said beam concurrently with color changes of said video signals, whereby to selectively excite the differently colored light emitting areas of said screen in coincidence with the intensity modulation of said beam in accordance with the different image color components.

4. A color television system, comprising a cathode ray image reproducing tube including a source of an electron beam and a fluorescent screen having a plurality of groups of areas respectively capable of emitting light of different colors when excited by said beam, means responsive to received video signals representative of differently colored light components of the image to be reproduced for modulating the intensity of said beam, means for deflecting said beam according to a predetermined pattern to scan said screen in complete image fields, means responsive to received synchronizing signals for generating a stepped wave keying voltage having an amplitude-change frequency corresponding to the color-change frequency of said video signals, means including an apertured electrode located in the path of said beam for developing a beam-deflecting field of substantially uniform intensity in all elemental portions thereof for additionally deflecting said beam in an amount dependent upon the velocity of said beam, and means for impressing said keying voltage between said field developing electrode and said electron beam source to vary the velocity of said beam concurrently with color changes of said video signals, whereby to selectively excite the differently colored light emitting areas of said screen in coincidence with the intensity modulation of said beam in accordance with the different image color components.

5. A color television system, comprising a cathode ray image reproducing tube including a source of an electron beam and a fluorescent screen having a plurality of groups of areas respectively capable of emitting light of different colors when excited by said beam, means responsive to received video signals representative of differently colored light components of the image to be reproduced for modulating the intensity of said beam, means for deflecting said beam according to a predetermined pattern to scan said screen in complete image fields, means for generating a stepped wave keying voltage having an amplitude-change frequency corresponding to the color-change frequency of said video signals, means including an electrode located in the path of said beam for developing a beam-deflecting field of substantially uniform intensity in all elemental portions thereof for additionally deflecting said beam in an amount dependent upon the velocity of said beam, and means for impressing said keying voltage upon said field-developing electrode to vary the velocity of said beam concurrently with color changes of said video signals, whereby to selectively excite the differently colored light emitting areas of said screen in coincidence with the intensity modulation of said beam in accordance with the different image color components.

6. A color television system, comprising a cathode ray image reproducing tube including a source of an electron beam and a fluorescent screen having a plurality of groups of areas respectively capable of emitting light of different colors when impinged by said beam, means for modulating the intensity of said beam in accordance with video signals representative of differently colored light components of the image to be reproduced, means for scanning said screen by said beam in a predetermined pattern, means including an apertured electrode mounted in spaced relation to said screen and to said beam source for producing a plurality of fields to be traversed by said beam, and means including said electrode for varying the velocity of said beam in its traversal of said fields to effect selective impingement of said beam upon the differently colored light emitting areas of said screen in coincidence with the intensity modulation of said beam in accordance with the different image color components.

7. A color television system, comprising a cathode ray image reproducing tube including a source of an electron beam and a fluorescent screen having a plurality of groups of areas respectively capable of emitting light of different colors when impinged by said beam, means for modulating the intensity of said beam in accordance with video signals representative of differently colored light components of the image to be reproduced, means for scanning said screen by said beam in a predetermined pattern, means including an electrode having an elongated aperture for each of said groups of screen areas and mounted in spaced relation to said screen and to said beam source for producing a plurality of electron deflecting fields to be traversed by said beam, and means including said electrode for varying the velocity of said beam in its traversal of said fields to effect selective impingement of said beam upon the differently colored light emitting areas of said screen in coincidence with the intensity modulation of said beam in accordance with the different image color components.

8. A color television system, comprising a cathode ray image reproducing tube including a source of an electron beam and a fluorescent screen having a plurality of groups of elongated substantially horizontal areas respectively capable of emitting light of different colors when impinged by said beam, said screen areas being of sub-elemental width, means for modulating the intensity of said beam in accordance with video signals representative of differently colored light components of the image to be reproduced, means for scanning said screen by said beam in a predetermined pattern, means including a horizontally apertured electrode mounted in spaced relation to said screen and to said beam source for producing a plurality of transverse fields to be traversed by said beam, and means including said electrode for varying the velocity of said beam in its traversal of said fields to effect selective impingement of said beam upon the differently colored light emitting areas of said screen in coincidence with the intensity modulation of said beam in accordance with the different image color components.

9. A color television system, comprising a cathode ray image reproducing tube including a source of an electron beam and a fluorescent screen having a plurality of groups of elongated substantially horizontal and parallel areas respectively capable of emitting light of different colors when impinged by said beam, said screen areas being of sub-elemental width and each group of said areas having an elemental horizontal image line width, means for modulating the intensity of said beam in accordance with video signals representative of differently colored light components of the image to be reproduced, means for scanning said screen by said beam in a predetermined pattern, means including an electrode having an elongated substantially horizontal aperture for each of said groups of screen areas and mounted between said screen and said beam source for producing a plurality of transverse electric fields to be traversed by said beam, and means including said electrode for varying the velocity of said beam in its traversal of said fields to effect selective impingement of said beam upon the differently colored light emitting areas of said screen in coincidence with the intensity modulation of said beam in accordance with the different image color components.

10. A color television image reproducing system wherein different video signals represent different color components of the image to be reproduced, comprising a cathode ray image reproducing tube including a source of electrons, a luminescent screen capable of emitting light of different colors when excited by said electrons, and color-selecting means associated with said cathode ray tube to control said electrons for selective excitation of said screen, said selective excitation depending upon the magnitude of the energization of said color-selecting means, means for sinusoidally varying the energization of said color-selecting means, and means to supply electrons from said source varying in intensity in accordance with received video signals and at a rate harmonically related to said sinusoidal variation of said color-selecting means energization.

11. A color television image reproducing system wherein each elemental area of the image to be reproduced is represented by successive groups of a plurality of time-spaced video signals, comprising a cathode ray image reproducing tube including means energizable to produce an electron beam, a luminescent screen capable of emitting light of different colors when selectively excited by said beam, and color-selecting apparatus associated with said cathode ray tube to control said beam for selective excitation of said screen, said selective excitation depending upon the energization of said color-selecting apparatus, means for sinusoidally varying the energization of said color-selecting apparatus, and means for periodically energizing said electron beam producing means in accordance with received video signals at a harmonic of the frequency of said sinusoidal energization of said color-selecting apparatus.

12. A color television image reproducing system wherein each elemental area of the image to be reproduced is represented by successive groups of a plurality of time-spaced video signals, comprising a cathode ray image reproducing tube including a source of an electron beam, a luminescent screen having a plurality of groups of areas respectively capable of emitting light of different colors when excited by said beam, and a color-selecting electrode to control said beam for selective excitation of respective ones of said screen areas capable of emitting light of different colors depending upon the energization of said electrode, means for sinusoidally varying the energizing potential of said electrode, and means for intermittently modulating said beam in accordance with received video signals at a rate equal to a multiple of said sinusoidal potential variation.

13. A color television system wherein different video signals represent different color components of the image to be reproduced, comprising a cathode ray image reproducing tube having a luminescent screen capable of emitting light of different colors when selectively impinged by electrons, color-selecting apparatus for controlling electrons for selective impingement of said screen associated with said cathode ray tube in accordance with the energization of said apparatus, means for developing energy of a variable magnitude having a sinusoidal wave form and a frequency related to the color-change frequency of received video signals and applying said energy to said color-selecting apparatus, means for developing energy having a frequency harmonically related to the frequency of said color-selecting apparatus energy, means controlled by said harmonic energy and received video signals to develop and direct groups of electrons toward said screen at said harmonic frequency, and means to adjust the relative phase of said sinusoidal energy and said harmonic energy suitably to effect the development of said groups of electrons at different magnitudes of said sinusoidal energy.

14. A color television image reproducing system wherein each elemental area of the image to be reproduced is represented by successive groups of a plurality of time-spaced video signals, comprising a cathode ray image reproducing tube including a source of an electron beam, a luminescent screen having a plurality of groups of areas respectively capable of emitting light of different colors when excited by said beam, and an electron-pervious color-selecting electrode interposed between said screen and said electron source to effect color-selecting deflection of portions of said beam to respective ones of said screen areas capable of emitting light of a selected color depending upon the energization of said electrode, means for sinusoidally varying the energizing potential of said electrode, and means for modulating said beam in accordance with received video signals at a rate equal to a multiple of said sinusoidal potential variation.

15. A color television image reproducing system wherein each elemental area of the image to be reproduced is represented by successive groups of a plurality of time-spaced video signals, comprising a cathode ray image reproducing tube including a source of an electron beam, a luminescent screen having a plurality of groups of areas respectively capable of emitting light of different colors when excited by said beam, and an apertured color-selecting electrode interposed between said screen and said electron source, said apertures serving to effect color-selecting deflection of portions of said beam to respective ones of said screen areas capable of emitting light of a selected color depending upon the energization of said electrode, means for sinusoidally varying the energizing potential of said electrode at the image elemental scanning rate, and means for modulating said beam in accordance with received video signals at a rate equal to a multiple of said elemental scanning rate.

16. A color television image reproducing system wherein each elemental area of the image to be reproduced is represented by successive groups of a plurality of time-spaced video signals, comprising a cathode ray image reproducing tube including a source of an electron beam, a luminescent screen having a plurality of groups of areas respectively capable of emitting light of different colors when excited by said beam, and an apertured electrode interposed between said screen and said electron source, said apertures being positioned to effect registration of portions of said beam and corresponding groups of said screen areas and also being asymmetric to effect color-selecting deflection of said registered beam portions to respective ones of said screen areas capable of emitting light of a selected color depending upon the energization of said electrode, means for sinusoidally varying the energizing potential of said electrode at the image elemental scanning rate, and means for modulating said beam in accordance with received video signals at a rate equal to a multiple of said elemental scanning rate corresponding to the number of component colors in which the image is to be reproduced.

17. A color television image reproducing system wherein each elemental area of the image to be reproduced is represented by successive groups of a plurality of time-spaced video signals, comprising a cathode ray image reproducing tube including a source of an electron beam, a luminescent screen having a plurality of groups of areas respectively capable of emitting light of different colors when excited by said beam, and an apertured electrode interposed between said screen and said electron source, said apertures being positioned to effect registration of portions of said beam and corresponding groups of said screen areas and also being asymmetric to effect color-selecting deflection of said registered beam portions to respective ones of said screen areas capable of emitting light of a selected color depending upon the energization of said electrode, means for sinusoidally varying the energizing potential of said electrode relative to the potential of said electron beam source at the image elemental scanning rate, and means for intermittently modulating said beam in accordance with received video signals at a rate equal to a multiple of said elemental scanning rate corresponding to the number of component colors in which the image is to be reproduced.

18. A color television image reproducing system wherein each elemental area of the image to be reproduced is represented by successive groups of a plurality of time-spaced video signals, comprising a cathode ray image reproducing tube including a source of an electron beam, a luminescent screen having a plurality of groups of areas respectively capable of emitting light of different colors when excited by said beam, and an apertured electrode interposed between said screen and said electron source, said apertures being positioned to effect registration of portions of said beam and corresponding groups of said screen areas and also being asymmetric to effect color-selecting deflection of said registered beam portions to respective ones of said screen areas capable of emitting light of a selected color depending upon the energization of said electrode, means for sinusoidally varying the energizing potential of said electrode at the image elemental scanning rate, means for intermittently modulating said beam in accordance with received video signals at a rate equal to a multiple of said elemental scanning rate corresponding to the number of component colors in which the image is to be reproduced, and means for timing said intermittent beam modulation for occurrence substantially at 60, 180 and 300 degree points of said sinusoidal potential variation.

19. In a cathode ray tube for use in a color television system, a luminescent screen having a plurality of groups of discrete adjacent areas of sub-elemental dimensions, said areas being capable respectively of emitting differently colored light when impinged by an electron beam, and a color-selecting electrode located in the path of an electron beam directed toward said screen, said electrode having, for each of said groups of screen areas, a discrete asymmetric aperture in the vicinity of each of which to produce a field for deflecting an electron beam for impingement upon selected ones of said sub-elemental areas.

20. In a cathode ray tube for use in a color television system, a luminescent screen having a plurality of groups of adjacent areas of sub-elemental dimensions, said areas being capable respectively of emitting differently colored light when impinged by an electron beam, and a color-selecting electrode located in the path of an electron beam directed toward said screen, said electrode comprising two grid structures mounted in parallel planes substantially normal to the path of the electron beam, each of said grid structures including a plurality of spaced substantially parallel members defining elongated apertures in said respective structures, and the members of one of said structures being displaced relative to the corresponding members of the other of said structures, thereby defining asymmetric apertures in the vicinity of which to produce fields for deflecting an electron beam for impingement upon selected ones of said sub-elemental screen areas.

21. In a cathode ray tube for use in a color television system, a luminescent screen having a plurality of groups of adjacent areas of sub-elemental dimensions, said areas being capable respectively of emitting differently colored light when impinged by an electron beam, and a color-selecting electrode located in the path of an electron beam directed toward said screen, said electrode comprising a plurality of spaced substantially parallel members of S-shaped cross-sectional configuration defining elongated asymmetric apertures in the vicinity of which to produce fields for deflecting an electron beam for impingement upon selected ones of said sub-elemental screen areas.

22. In a cathode ray tube for use in a color television system, a luminescent screen having a plurality of groups of adjacent areas of sub-elemental dimensions, said areas being capable respectively of emitting differently colored light when impinged by an electron beam, and a color-selecting electrode located in the path of an electron beam directed toward said screen, said electrode comprising a plurality of spaced substantially parallel members of right-angular cross-sectional configuration defining elongated asymmetric apertures in the vicinity of which to produce fields for deflecting an electrode beam for impingement upon selected ones of said sub-elemental screen areas.

23. In a cathode ray tube for use in a color television system, a luminescent screen having a plurality of groups of adjacent areas of sub-elemental dimensions, said areas being capable respectively of emitting differently colored light when impinged by an electron beam, and a color-selecting electrode located in the path of an electron beam directed toward said screen, said electrode comprising a foraminous structure having protuberances formed on one face thereof adjacent corresponding portions of the apertures of said structure, thereby providing asymmetric apertures in the vicinity of which to produce fields for deflecting an electron beam for impingement upon selected ones of said sub-elemental screen areas.

24. In a cathode ray tube for use in a color television system, a luminescent screen having a plurality of groups of adjacent areas of sub-elemental dimensions, said areas being capable respectively of emitting differently colored light when impinged by an electron beam, and a color-selecting electrode located in the path of an electron beam directed toward said screen, said electrode comprising two foraminous structures mounted in parallel planes substantially normal to the path of an electron beam, the apertures of one of said structures being larger than and displaced relative to the apertures of the other of said structures, thereby defining asymmetric apertures in the vicinity of which to produce fields for deflecting an electron beam for impingement upon selected ones of said sub-elemental screen areas.

25. In a color television system, a cathode ray image reproducing tube including a source of an electron beam, a luminescent screen spaced from said beam source and having a plurality of groups of areas respectively capable of emitting light of different colors when excited by an electron beam, means including an electron-pervious color-selecting electrode mounted in spaced relation to said screen and to said beam source and variably energizable to selectively deflect said beam to respective ones of said differently colored light-emitting screen areas, and means accelerating said selectively deflected beam in the region between said color-selecting electrode and said screen.

26. In a color television system, a cathode ray image reproducing tube including a source of a relatively low velocity electron beam, a luminescent screen spaced from said beam source and having a plurality of groups of areas respectively capable of emitting light of different colors when excited by an electron beam, means including an electron-pervious color-selecting electrode mounted in spaced relation to said screen and to said beam source to effect color-selecting deflection of said beam to respective ones of said differently colored light-emitting screen areas depending upon the energization of said electrode, means for varying the energization of said electrode at the image color-changing rate, and means producing a field between said screen and said color-selecting electrode to increase the velocity of said beam after said color-selecting deflection thereof.

27. In a color television system, a cathode ray image reproducing tube including a source of an electron beam, a luminescent screen spaced from said beam source and having a plurality of groups of areas respectively capable of emitting light of different colors when excited by said beam, and color-selecting means including an electron-pervious electrode mounted between said screen and said electron beam source and capable of producing a plurality of fields to be traversed by said beam, said fields being of a character tending to deflect said beam to effect selective excitation of the differently colored light-emitting areas of said screen, the magnitude of said color-selecting beam deflection being dependent upon the relationship of said fields and the velocity of said beam, means including said electrode to vary said relationship periodically, and means including said electrode and said screen to produce in the region between said electrode and said screen a field of a character tending to accelerate said beam.

28. In a color television system, a cathode ray image reproducing tube including a source of an electron beam, a luminescent screen spaced from said beam source and having a plurality of groups of mutually parallel phosphor strips respectively capable of emitting light of different colors when excited by said beam, means including an apertured color-selecting electrode mounted between said screen and said beam source in the vicinity of said screen and energizable to selectively deflect said beam to respective ones of said differently colored light-emitting strips, said color-selecting electrode having means defining elongated apertures for and in substantial alignment with respective groups of said phosphor strips, means energizing said color-selecting electrode in a manner to produce beam-deflecting fields in said apertures, means varying said color-selecting electrode energization to effect said selective beam deflection, and means impressing upon said screen a potential of positive polarity relative to the potential of said color-selecting electrode.

29. In a color television system, apparatus as defined in claim 28 wherein, said color-selecting electrode aperture-defining means comprises, a plurality of substantially parallel elongated metallic members, alternate ones of said metallic members being connected together electrically to form two interleaved meshes, and said color-selecting electrode energizing means includes a source of potential coupled to said respective meshes in opposite polarities.

30. In a cathode ray tube for use in a color television system, a luminescent screen having a plurality of groups of adjacent areas of sub-elemental dimensions, said areas being capable respectively of emitting differently colored light when excited by an electron beam, and a color-selecting electrode located in the path of an electron beam directed toward said screen, said electrode having a plurality of asymmetric apertures in the vicinity of each of which to produce a field for deflecting an electron beam for impingement upon selected ones of said sub-elemental screen areas.

31. A cathode ray tube as defined in claim 30, in which said screen areas are elongated and are of sub-elemental width, and said electrode apertures are defined by members extending in the direction of said elongated screen areas.

32. A cathode ray tube as defined in claim 30, in which said screen areas are elongated and are of sub-elemental width, and said color-selecting electrode has a cross-sectional configuration in a direction substantially at right angles to said elongated screen areas to define said asymmetric apertures extending in the direction of said elongated screen areas.

PAUL K. WEIMER.

References Cited in the file of this patent

UNITED STATES PATENTS

| Number | Name | Date |
|---|---|---|
| 2,307,188 | Bedford | Jan. 5, 1943 |
| 2,343,825 | Wilson | Mar. 7, 1944 |
| 2,431,115 | Goldsmith | Nov. 18, 1947 |
| 2,446,791 | Schroeder | Aug. 10, 1948 |
| 2,461,515 | Bronwell | Feb. 15, 1949 |
| 2,480,848 | Geer | June 9, 1949 |
| 2,481,839 | Goldsmith | Sept. 13, 1949 |
| 2,508,267 | Kasperowicz | May 16, 1950 |
| 2,532,511 | Okolicsanyi | Dec. 5, 1950 |

FOREIGN PATENTS

| Number | Country | Date |
|---|---|---|
| 866,065 | France | Mar. 31, 1941 |